US011949195B2

(12) United States Patent
Chen

(10) Patent No.: US 11,949,195 B2
(45) Date of Patent: Apr. 2, 2024

(54) FLOATING CONNECTOR AND ASSEMBLY THEREOF

(71) Applicant: Molex, LLC, Lisle, IL (US)

(72) Inventor: Feng Chen, Shanghai (CN)

(73) Assignee: Molex, LLC, Lisle, IL (US)

( * ) Notice: Subject to any disclaimer, the term of this patent is extended or adjusted under 35 U.S.C. 154(b) by 118 days.

(21) Appl. No.: 17/712,195

(22) Filed: Apr. 4, 2022

(65) Prior Publication Data

US 2022/0337007 A1 Oct. 20, 2022

(30) Foreign Application Priority Data

Apr. 19, 2021 (CN) ......................... 202110417476.5

(51) Int. Cl.
*H01R 24/50* (2011.01)
*H01R 12/91* (2011.01)
(Continued)

(52) U.S. Cl.
CPC ............. *H01R 24/50* (2013.01); *H01R 12/91* (2013.01); *H01R 13/502* (2013.01); *H01R 13/6315* (2013.01)

(58) Field of Classification Search
CPC .... H01R 24/50; H01R 24/52; H01R 13/6315; H01R 13/502; H01R 13/2421; H01R 12/91
(Continued)

(56) References Cited

U.S. PATENT DOCUMENTS 5,329,262 A * 7/1994 Fisher, Jr. .............. H01R 24/44 333/260
5,516,303 A * 5/1996 Yohn .................. H01R 13/6315 439/248
(Continued)

FOREIGN PATENT DOCUMENTS

CN 106663903 B 5/2019
CN 210723410 U 6/2020
(Continued)

OTHER PUBLICATIONS

JP-2012042252-A with translation (Year: 2012).*
(Continued)

*Primary Examiner* — Marcus E Harcum

(57) ABSTRACT

A floating connector and an assembly thereof are provided. The floating connector includes: a center conductive pin; an insulating seat which surrounds the center conductive pin; a mating side conductive shell which surrounds an outer periphery of the insulating seat; a movable conductive shell which is movably received in mating side conductive shell; an elastic element which elastically abuts against an upper end of the movable conductive shell; and an inner conductive shell which is interposed between the elastic element and the center conductive pin; the inner conductive shell has a fixing portion and a movable contacting portion, the fixing portion snaps on one of the mating side conductive shell and the movable conductive shell; the movable contacting portion slideably elastically abuts against the other of the mating side conductive shell and the movable conductive shell. In a vibration circumstance, a good electrical connection can be maintained and transmission quality of an electrical signal can also be promoted at the same time, which is particularly applicable to a situation of high frequency signal transmission.

10 Claims, 18 Drawing Sheets

(51) Int. Cl.
*H01R 13/502* (2006.01)
*H01R 13/631* (2006.01)

(58) Field of Classification Search
USPC .......................................... 439/700, 248, 252
See application file for complete search history.

(56) References Cited

U.S. PATENT DOCUMENTS

| | | | | |
|---|---|---|---|---|
| 6,053,777 | A * | 4/2000 | Boyle | H01R 13/2421 439/700 |
| 6,447,303 | B1 | 9/2002 | Kihira et al. | |
| 6,758,680 | B2 * | 7/2004 | Duquerroy | H01R 24/50 439/63 |
| 7,422,456 | B1 * | 9/2008 | Mitani | H01R 13/6315 439/247 |
| 7,922,529 | B1 * | 4/2011 | Meurer | H01R 13/2421 439/700 |
| 8,622,762 | B2 * | 1/2014 | Van Swearingen | H01R 24/38 439/950 |
| 8,641,446 | B1 * | 2/2014 | Chen | H01R 24/52 439/578 |
| 9,391,409 | B2 | 7/2016 | Abe et al. | |
| 10,193,252 | B2 | 1/2019 | Sakamoto | |
| 11,239,616 | B2 * | 2/2022 | Park | H01R 13/6588 |
| 11,569,614 | B2 * | 1/2023 | Tsuchiya | H01R 24/50 |
| 2010/0322564 | A1 * | 12/2010 | Shimotsu | G02B 6/3846 385/60 |
| 2011/0318959 | A1 * | 12/2011 | Uesaka | H01R 13/2492 439/581 |
| 2016/0164233 | A1 * | 6/2016 | Zhu | H01R 24/50 439/248 |
| 2020/0203901 | A1 * | 6/2020 | Gruber | H01R 12/75 |
| 2021/0057837 | A1 * | 2/2021 | Wang | H01R 12/7082 |
| 2021/0288443 | A1 * | 9/2021 | Brandt | H01R 12/714 |
| 2021/0313746 | A1 * | 10/2021 | Kato | H01R 13/6215 |
| 2021/0399468 | A1 * | 12/2021 | Gingrich, III | H01R 13/426 |
| 2021/0399506 | A1 * | 12/2021 | Blasick | H01R 13/187 |
| 2022/0131301 | A1 * | 4/2022 | Volkov | H01R 13/2421 |

FOREIGN PATENT DOCUMENTS

| | | | |
|---|---|---|---|
| CN | 210897721 | U | 6/2020 |
| CN | 212412368 | U | 1/2021 |
| JP | 2016125841 | A | 7/2016 |
| JP | 6442345 | B2 | 12/2018 |

OTHER PUBLICATIONS

CN-111162398-A with translation (Year: 2020).*
WO-2014100997-A1 with translation (Year: 2014).*
CA-2596351-A1 with translation (Year: 2006).*
CN-110323616-A with translation (Year: 2019).*

* cited by examiner

FLOATING CONNECTOR AND ASSEMBLY THEREOF

RELATED APPLICATIONS

The present application claims priority to Chinese Patent Application No. 202110417476.5 filed on Apr. 19, 2021 which is incorporated by reference in its entirety.

TECHNICAL FIELD

The present disclosure relates to the field of electrical connectors, and particularly relates to a floating connector and an assembly thereof which can maintain good electrical connection in a vibration circumstance.

BACKGROUND ART

Chinese utility model application issuance publication No. CN210723410U discloses a multidirectional deviation tolerated board-to-board coaxial connector, which includes: an outer elastic conductive assembly a lower portion of the outer elastic conductive assembly is fixedly electrically connected with a first conductor of a fixing-end PCB, an upper portion of the outer elastic conductive assembly has a metal outer shell which can telescopically float in a vertical direction and/or obliquely float in the vertical direction; a center elastic conductive assembly which is coaxially mounted in the outer elastic conductive assembly, a lower portion of the center elastic conductive assembly is fixedly electrically connected with a second conductor of the fixing-end PCB, an upper portion of the center elastic conductive assembly has a center conductor which can telescopically float in vertical direction; an insulator which is provided between the center elastic conductive assembly and the outer elastic conductive assembly and makes the center elastic conductive assembly and the outer elastic conductive assembly insulated from each other; an upper portion of the metal outer shell and an upper portion of the center conductor respectively abut against and are electrically connected with two contacting points of a floating-end PCB in elastic floating which tolerates multidirectional deviation.

Such a design of the multidirectional deviation tolerated connector may reduce a problem of misalignment and unreliable connection occurring in a process of mounting the floating-end PCB and the fixing-end PCB and may promote mounting efficiency. However, in this solution, on one hand, because the insulator provided between the center elastic conductive assembly and an elastic element of the outer elastic conductive assembly does not function as shielding for a signal, a high frequency signal transmitted by the center elastic conductive assembly acts on the elastic element of the outer elastic conductive assembly, which easily generates an echo to form noise interference; on the other hand, a thickness of a metal base cannot be made thinner because structure strength of the connector is required to be maintained, a material is also prejudicially selected to not have better elasticity but have better rigidity, so elasticity of contact maintained between a first hanging step of the metal base and the metal outer shell is often poor, which easily generates a problem of immediate rupture, so it needs to make further improvement.

SUMMARY

A technical problem to be resolved by the present disclosure is to overcome the deficiency existing in the above prior art and to provide a floating connector and an assembly thereof which can maintain a good electrical connection and promote transmission quality of an electrical signal in a vibration circumstance.

According to one aspect of the present disclosure, the present disclosure provides a floating connector comprising: a center conductive pin which comprises an upper mating element and a lower mating element; an insulating seat which surrounds the center conductive pin therein; a mating side conductive shell which surrounds an outer periphery of the insulating seat and forms a receiving cavity positioned below the insulating seat; a movable conductive shell, an upper end of which is movably received in the receiving cavity and extends downwardly from the receiving cavity; an elastic element which elastically abuts against the upper end of the movable conductive shell; and an inner conductive shell which is mounted in the receiving cavity and is used to electrically connect the mating side conductive shell and the movable conductive shell, the inner conductive shell is interposed between the elastic element and the center conductive pin; the inner conductive shell has: a fixing portion which snaps on one of the mating side conductive shell and the movable conductive shell; and a movable contacting portion which slideably elastically abuts against the other of the mating side conductive shell and the movable conductive shell.

According to another aspect of the present disclosure, the present disclosure provides a floating connector assembly comprising a circuit board, a connector base fixed on the circuit board and the aforementioned floating connector mounted on the connector base; the connector base comprises a metal post, an insulator which surrounds the metal post and an outer metal shell which is fixed to an outer surface of the insulator; the metal post mates with the lower mating element of the center conductive pin, the outer metal shell mates with a lower end of the movable conductive shell.

According to still another aspect of the present disclosure, the present disclosure provides a floating connector assembly comprising a circuit board and the aforementioned floating connector mounted on the circuit board; the circuit board being provided with a center contacting point and an outer side contacting point which is spaced apart from and surrounds the center contacting point from outside; the lower mating element of the center conductive pin electrically connects with the center contacting point; a lower end of the movable conductive shell electrically connects with the outer side contacting point.

In comparison with the prior art, the present disclosure at least has following advantages: in the floating connector of the present disclosure, the inner conductive shell always maintains connection with the mating side conductive shell and the movable conductive shell via the fixing portion and the movable contacting portion, the electrical connection between the mating side conductive shell and the movable conductive shell is maintained, so that stability of the exterior electrical connection path is maintained. Because the inner conductive shell is an independent component which is independent from the mating side conductive shell and the movable conductive shell, it is more flexible for the inner conductive shell to select material and fabricating process, the inner conductive shell may have better elasticity and does not easily generate a problem of immediate rupture. Based on provision of the inner conductive shell, the mating side conductive shell and the movable conductive shell may use a clearance fit design, so that the mating side conductive shell and the movable conductive shell not only can relatively slide in the up-down direction, but also can generate relative floating in the horizontal direction, which can be applicable to a field where vibration level is higher. At the same time, the inner conductive shell is interposed between the elastic element and the center conductive pin to partition the elastic element from the center conductive pin, the inner conductive shell may function as shielding, so that electromagnetic radiation emitted by a high speed electrical signal of the center conductive pin can be prevented from acting on the elastic element to generate an improper reflected noise, so that transmission quality of the electrical signal is promoted.

DETAILED DESCRIPTION OF THE PREFERRED EMBODIMENTS

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure do not to imply that every embodiment thereof must have the described feature. Furthermore, it should be noted that the description illustrates a number of features. While certain features may be combined together to illustrate potential system designs, those features may also be used in other combinations not expressly described. Thus, the described combinations are not intended to be limiting, unless otherwise noted.

In the embodiments illustrated in the figures, representations of directions such as up, down, left, right, front and rear, used for explaining the structure and movement of the various components of the present disclosure, are not absolute, but relative. These representations are appropriate when the components are in the position shown in the figures. If the description of the position of the components changes, however, these representations are to be changed accordingly.

Hereinafter, preferred embodiments of the present disclosure are further described in detail in combination with the figures of the present disclosure.

FIG. 1 to FIG. 10 schematically illustrate a structure of a floating connector assembly 100 of a first embodiment of the present disclosure.

Figure 1:
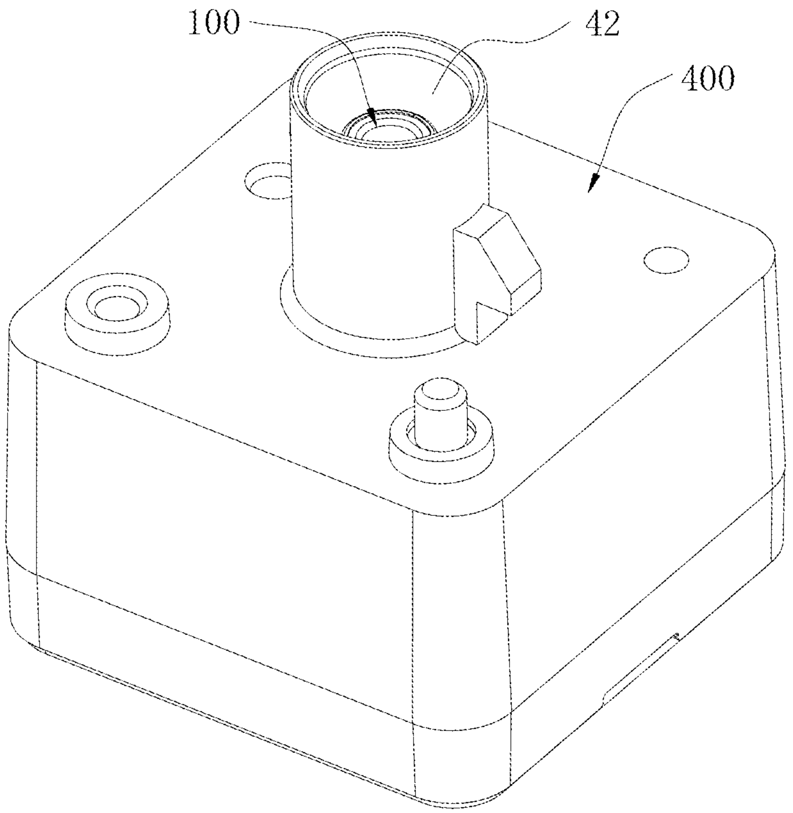
FIG. 1 is a schematic view of a floating connector assembly of a first embodiment of the present disclosure in a specific use.
Figure 2:
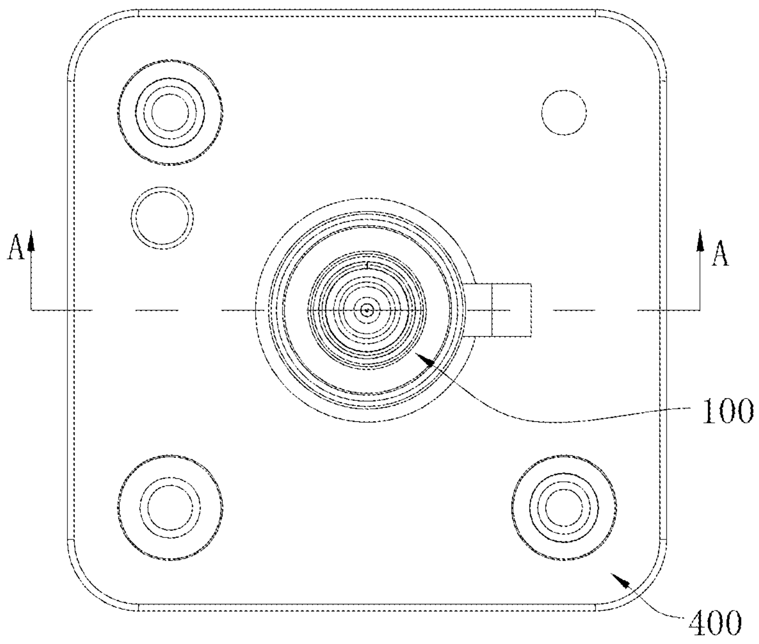
FIG. 2 is a front view of FIG. 1.
Figure 3:
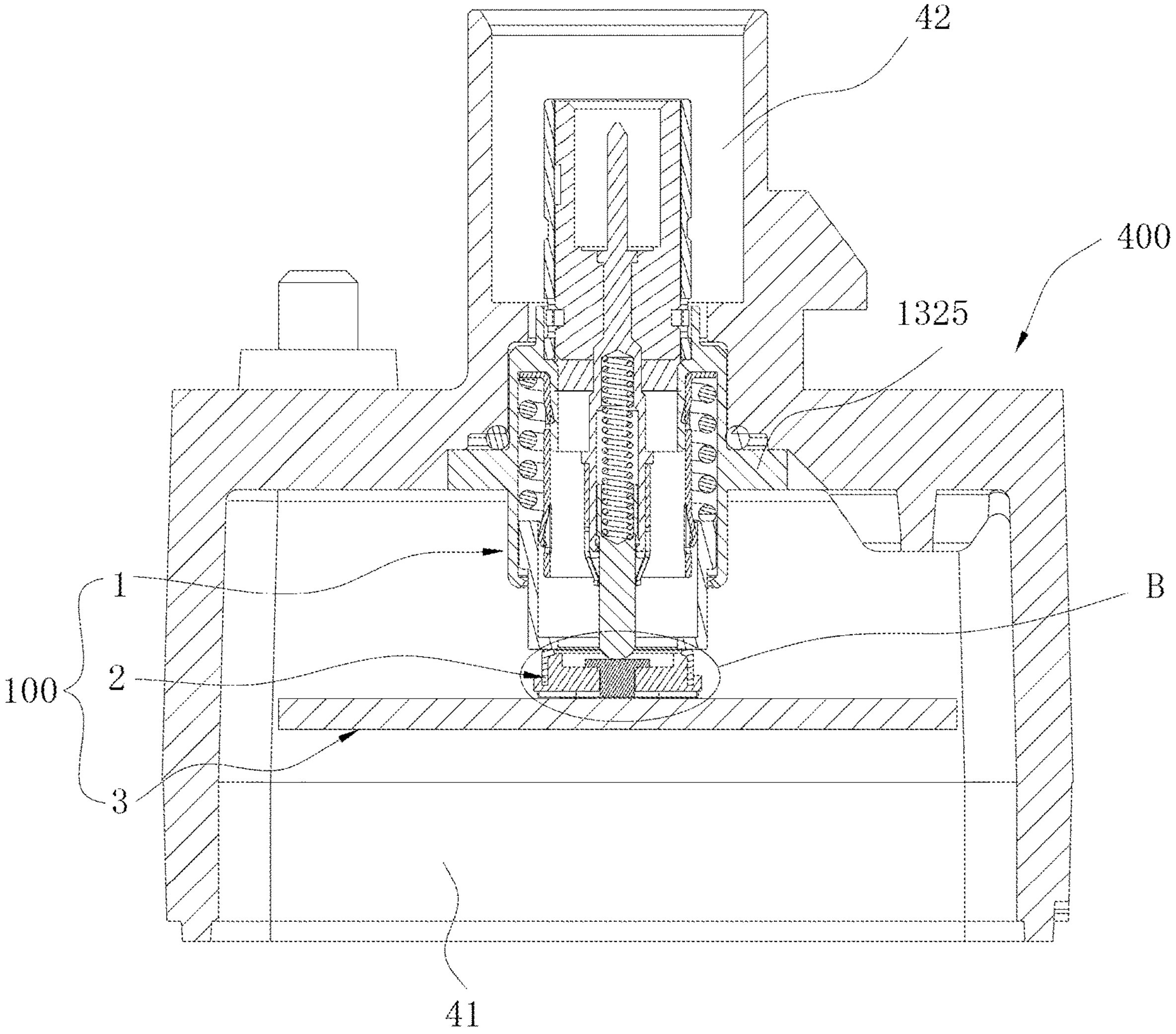
FIG. 3 is a cross sectional view taken along a line A-A of FIG. 2.

Firstly, referring to FIG. 1 to FIG. 3, the floating connector assembly 100 may be mounted into a mounting shell 400 in a specific use. The mounting shell 400 is provided with a mounting cavity 41 and a mating cavity 42 positioned above the mounting cavity 41. The mounting cavity 41 may receive an electric element (not shown) according to use requirement, for example, the electric element is a camera. The mating cavity 42 may allow a cable connector (not shown) to insert therein. The floating connector assembly 100 is received in the mounting shell 400, is respectively connected to the electric element and the cable connector, so as to realize signal transmission between the electric element and the cable connector.

For sake of convenient description, herein a side where the mating cavity 42 of the mounting shell 400 is presented is defined as "up", and a side where the mounting cavity 41 is presented is defined as "down".

Figure 4:
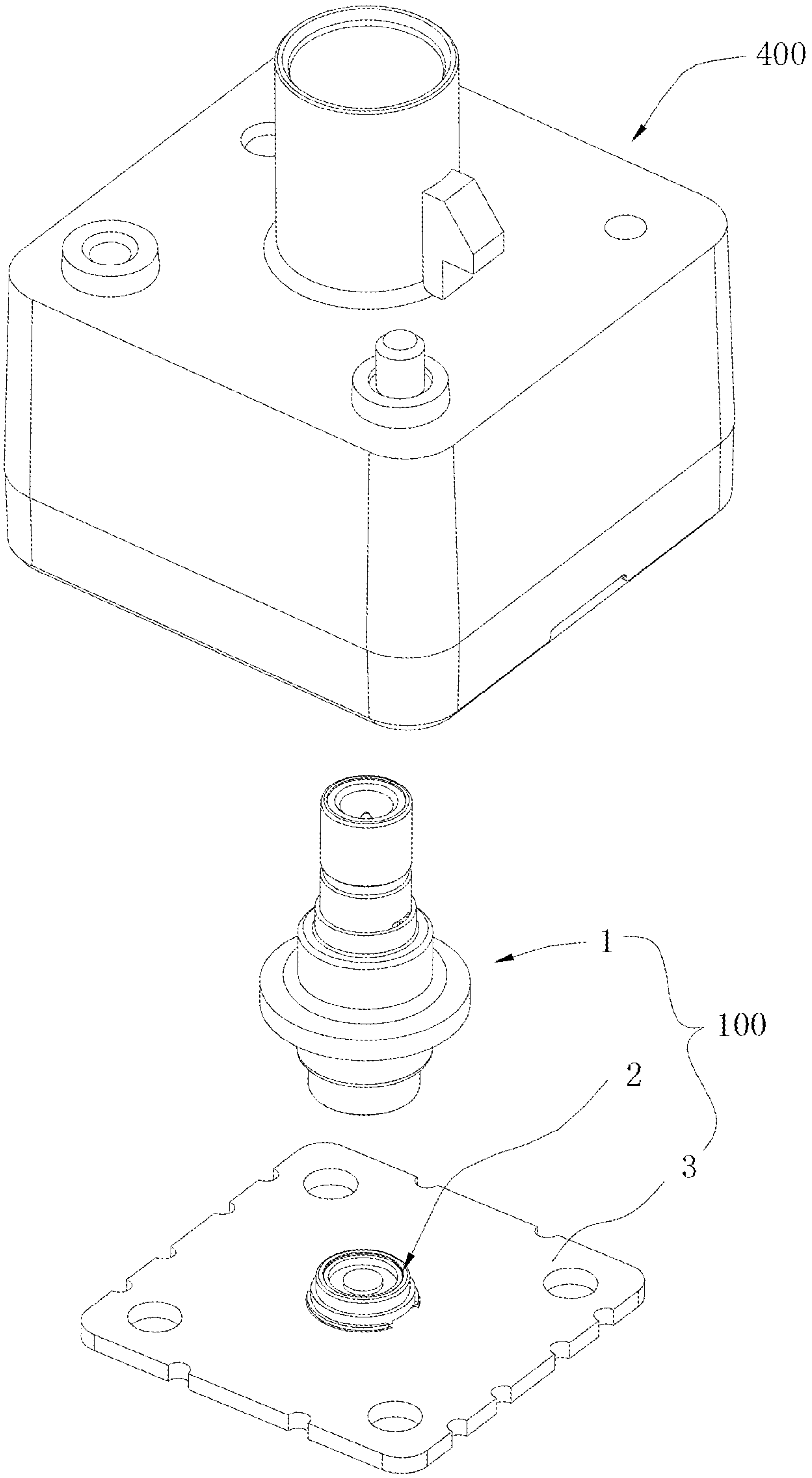
FIG. 4 is a perspective exploded view of FIG. 1.

In combination with FIG. 3 and FIG. 4, the floating connector assembly 100 of the present embodiment includes a circuit board 3, a connector base 2 fixed on the circuit board 3 and a floating connector 1 mounted above the connector base 2. The floating connector assembly 100 may be mounted into the mounting shell 400 from a side where a mounting cavity 41 of the mounting shell 400 is presented, an upper portion of the floating connector 1 enters into the mating cavity 42, a lower portion of the floating connector 1, the connector base 2 and the circuit board 3 are received in the mounting cavity 41, a lower side of the circuit board 3 is used to allow the electric element to mounted thereon.

Preferably, in the mounting shell 400, a step-type structure is formed between the mounting cavity 41 and the mating cavity 42, the floating connector 1 is provided with a limiting flange 1325 protruding outwardly, the limiting flange 1325 and the mounting shell 400 play limiting in position.

The connector base 2 may be fixed on the circuit board 3 by soldering and the like, so as to realize electrical connection between the floating connector 1 and the circuit board 3.

Figure 5:
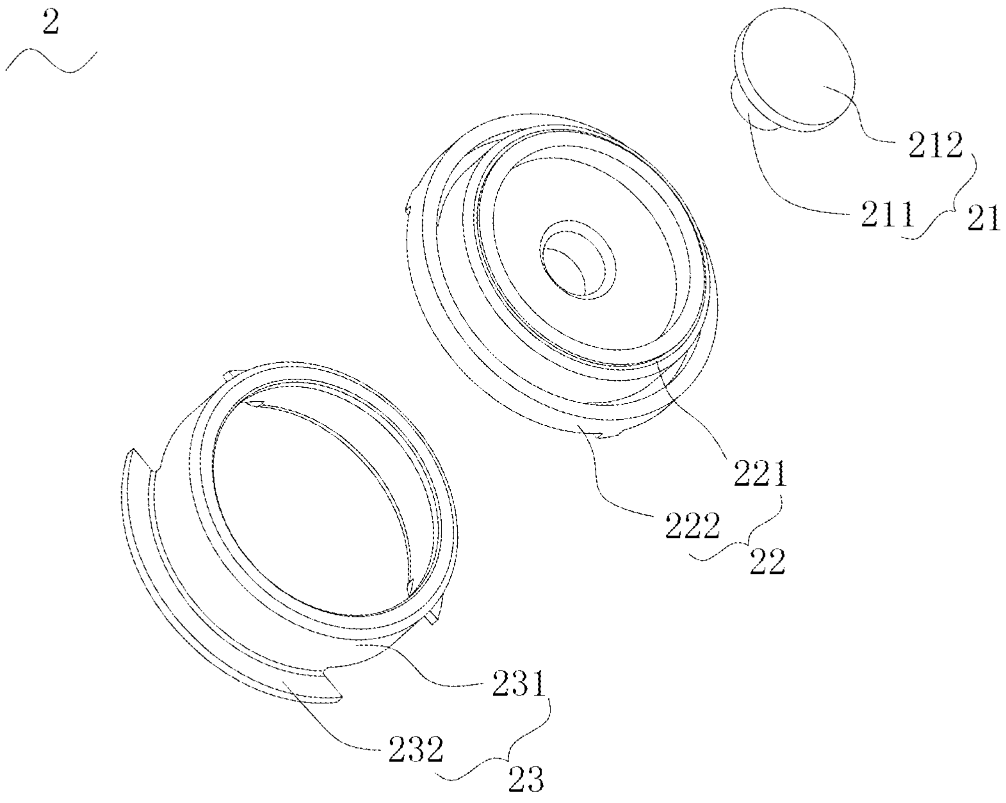
FIG. 5 and FIG. 6 are perspective exploded views of a connector base of FIG. 4 from two different angles.
Figure 6:
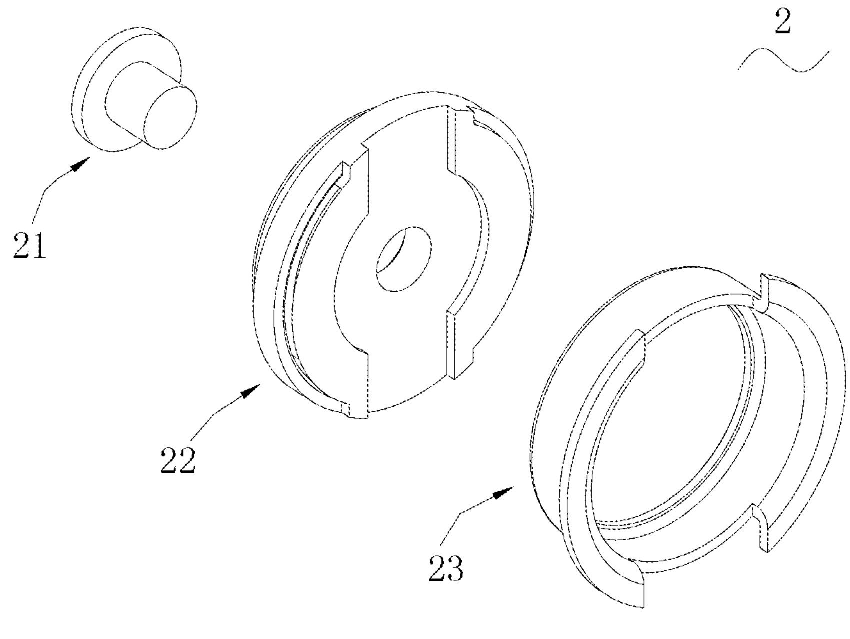
Figure 7:
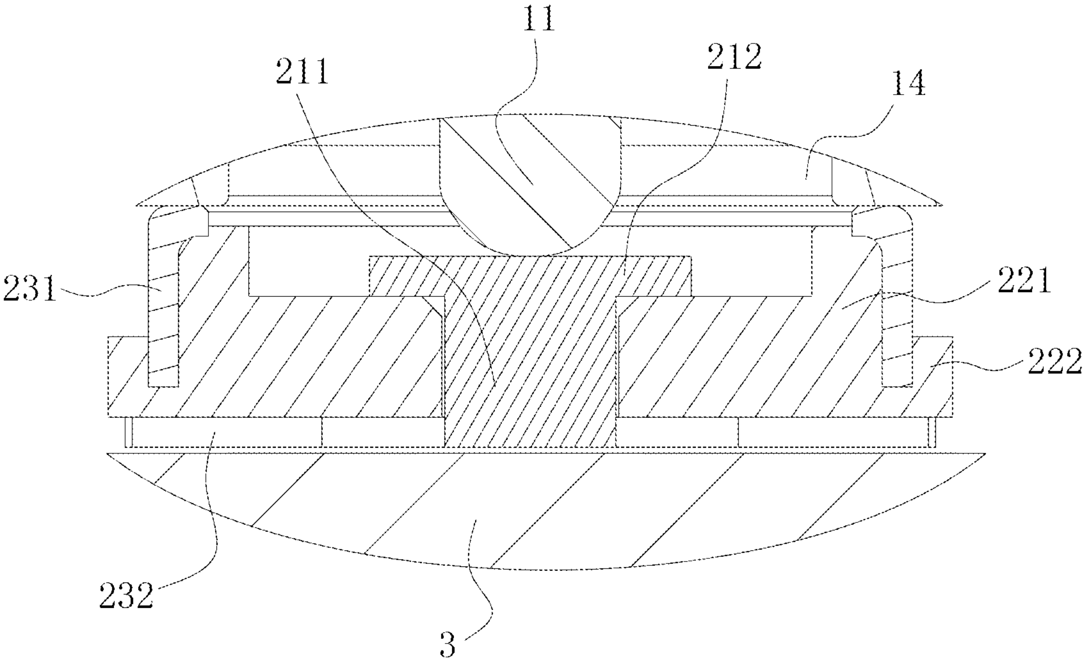
FIG. 7 is a partially enlarged view of a part of FIG. 3 indicated by B.

Referring to FIG. 5 to FIG. 7, the connector base 2 includes a metal post 21, an insulator 22 surrounding the metal post 21 and an outer metal shell 23 fixed to an outer surface of the insulator 22.

The insulator 22 fixes and isolates the metal post 21 and the outer metal shell 23. In the present embodiment, the insulator 22 substantially includes a body portion 221 and an embracing portion 222 which encircles and is positioned at an outer side of a lower end of the body portion 221.

The metal post 21 is a solid metal conductor, is positioned at a center of the insulator 22, the metal post 21 and the insulator 22 are preferably engaged with each other as integral by inject molding. In the present embodiment, the metal post 21 has a soldering portion 211 and a mating portion 212 positioned above the soldering portion 211, the soldering portion 211 is a cylinder shape, a periphery of the mating portion 212 exceeds the soldering portion 211. The mating portion 212 is exposed on a top surface of the body portion 221. The soldering portion 211 passes through the body portion 221 along an up-down direction, and is exposed on a bottom surface of the body portion 221.

The outer metal shell 23 includes a barrel body 231 which is a substantially circular barrel shape and two soldering sheets 232 which bend outwardly from a lower end of the barrel body 231, extend and is a flat sheet shape. The barrel body 231 sheathes an outer periphery of the body portion 221, and is embraced by the embracing portion 222, so that the outer metal shell 23 and the insulator 22 may be more firmly engaged with each other.

The soldering portion 211 of the metal post 21 and the soldering sheet 232 of the outer metal shell 23 are respectively soldered with corresponding contacting points (not shown) on the circuit board 3, so the connector base 2 is fixed on the circuit board 3.

In other embodiment, the connector base 2 also is not limited to the structure as shown in these figures. It may be understood that, a function of the connector base 2 lies in to make the floating connector 1 and the circuit board 3 reliably electrically connected together, other connector base 2 which can realize the corresponding function also may be used.

Figure 8:
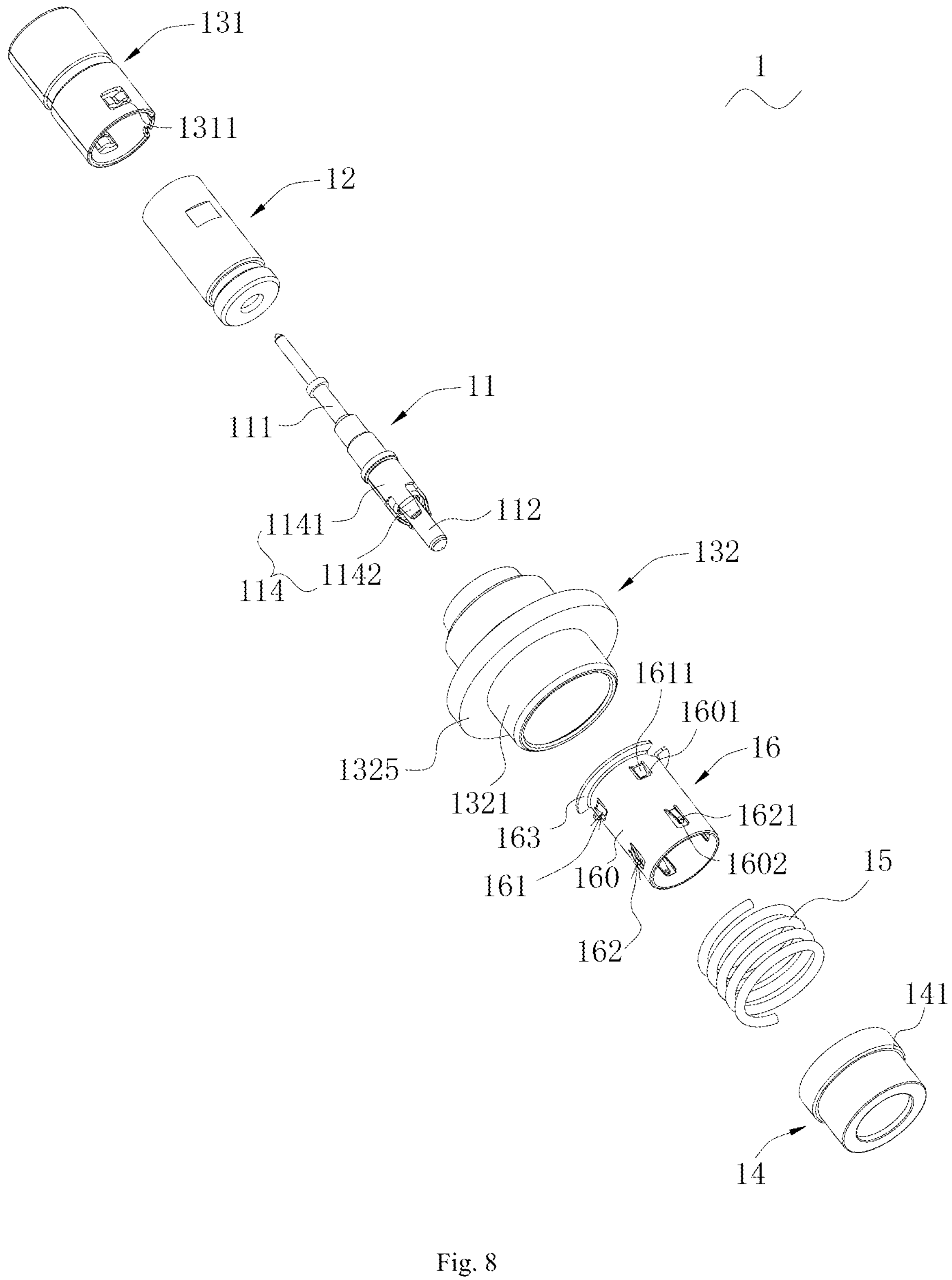
FIG. 8 and FIG. 9 are perspective exploded views of the floating connector of FIG. 4 from two different angles.
Figure 9:
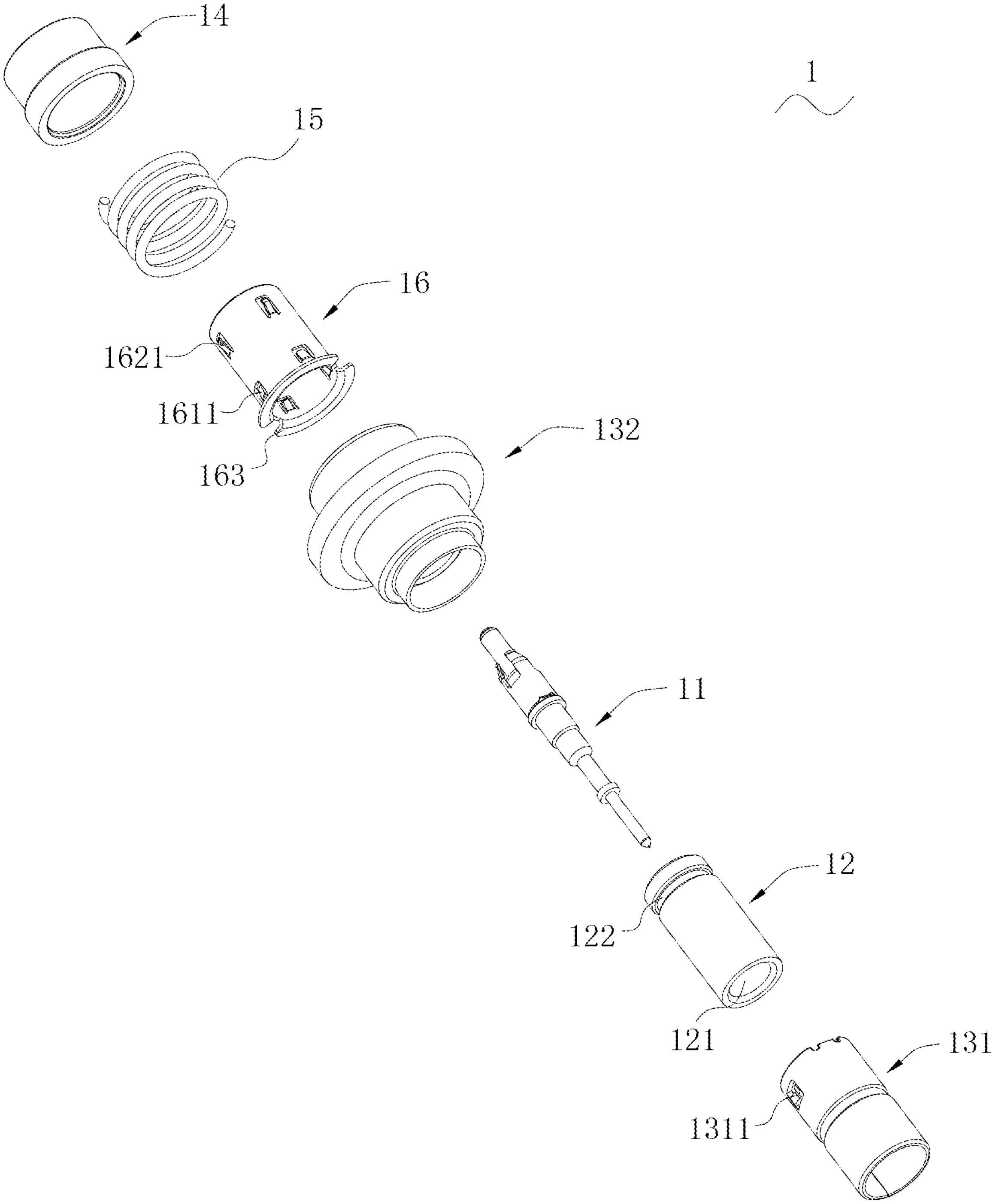
Figure 10:
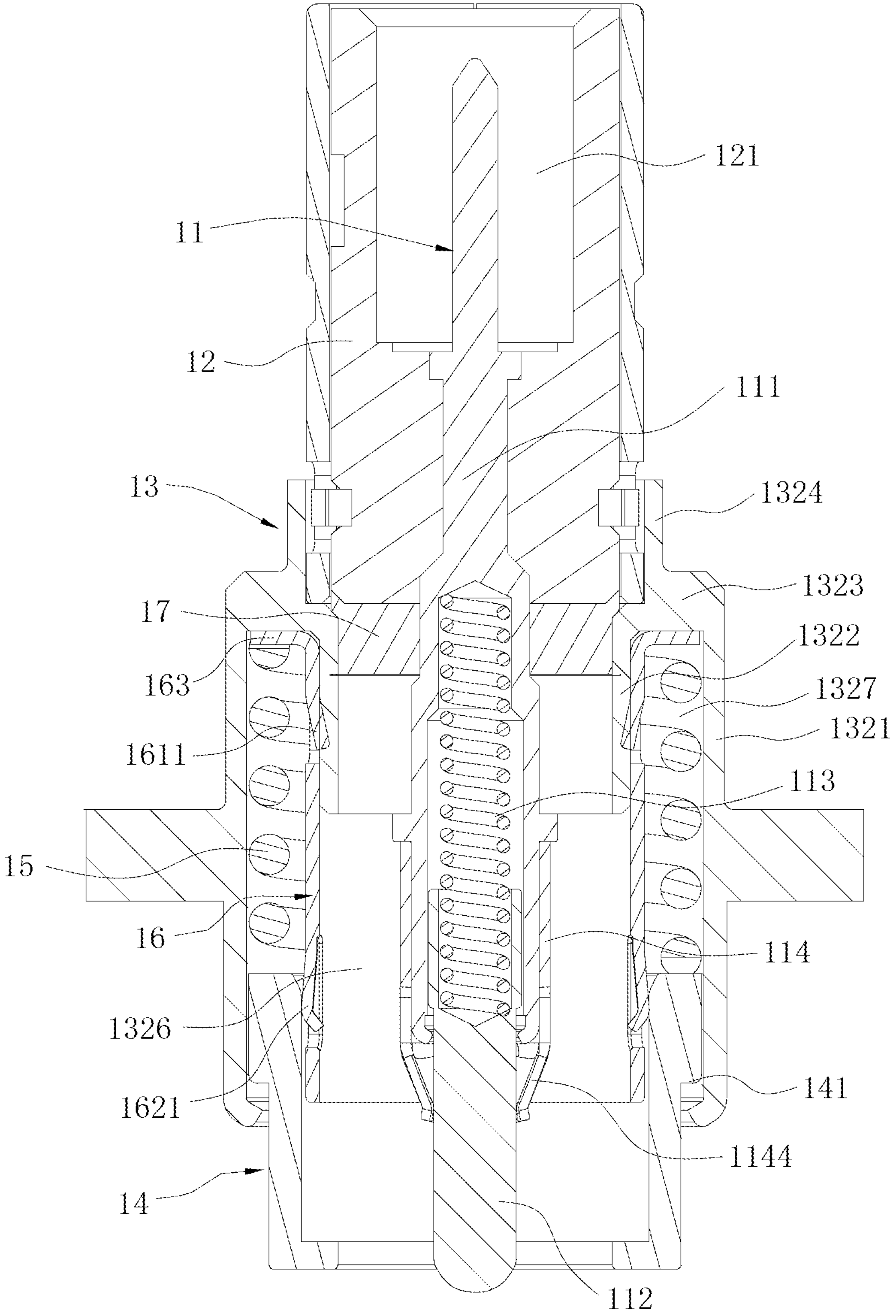
FIG. 10 is a cross sectional enlarged view of a floating connector of FIG. 3 in a natural state.

Referring to FIG. 8 to FIG. 10, the floating connector 1 of the present preferred embodiment mainly includes a center conductive pin 11, an insulating seat 12 which surrounds the center conductive pin 11, a mating side conductive shell 13 which further surrounds an outer periphery of the insulating seat 12, a movable conductive shell 14 which is movably received in the mating side conductive shell 13, an elastic element 15 which is mounted between the mating side conductive shell 13 and the movable conductive shell 14, and an inner conductive shell 16 which is interposed between the elastic element 15 and the center conductive pin 11. Here, the center conductive pin 11 is used to establish one stable interior electrical connection path, the mating side conductive shell 13, the movable conductive shell 14 and the inner conductive shell 16 are cooperatively used to establish one stable exterior electrically connection path. By the two electrical connection paths, stable transmission of an electrical signal is realized.

Mainly referring to FIG. 10, the center conductive pin 11 of the present preferred embodiment employs a structure form of Pogo Pin, and includes an upper mating element 111, a lower mating element 112, a spring 113 and a conductive sheathe member 114.

A lower end of the upper mating element 111 is provided with a first receiving cavity, an upper end of the lower mating element 112 is provided with a second receiving cavity, the lower mating element 112 is receive in the first receiving cavity.

The spring 113 abuts against between the upper mating element 111 and the lower mating element 112, so as to allow that the upper mating element 111 and the lower mating element 112 can relatively elastically move. Specifically, an upper end of the spring 113 is received in the first receiving cavity, and a lower end of the spring 113 is received in the second receiving cavity.

In combination with FIG. 8 and FIG. 10, the conductive sheathe member 114 includes a sheathing portion 1141 and an elastic contacting portion 1142 extending from a lower end of the sheathing portion 1141. The sheathing portion 1141 is a barrel shape, sheathes an outer periphery of a lower portion of the upper mating element 111. The elastic contacting portion 1142 includes a plurality of contacting arms 1144 which extend from a lower end of the sheathing portion 1141 and are arranged along a circumferential direction of the elastic contacting portion 1142, two adjacent contacting arms 1144 are spaced apart from each other. Lower ends of the plurality of contacting arms 1144 gather toward a center of the conductive sheathe member 114, and slideably elastically abut against an outer surface of the lower mating element 112.

When the upper mating element 111 and the lower mating element 112 relatively move in the up-down direction, the contacting arm 1144 slides along the lower mating element 112 and always maintains to abut against the lower mating element 112; and, when the upper mating element 111 and the lower mating element 112 have a radial offset, by means of elastic deformation of the contacting arm 1144, the elastic contacting portion 1142 still can maintain good electrical contact with the lower mating element 112. Therefore, the center conductive pin 11 can always maintain good electrical connection, and promote reliability of signal transmission, which is particularly applicable to an application field where a vibration level is higher.

In an embodiment not shown in the figure, the sheathing portion 1141 of the conductive sheathe member 114 also may sheathe the lower mating element 112, and the elastic contacting portion 1142 correspondingly elastically abut against an outer surface of the upper mating element 111.

Referring to FIG. 9 and FIG. 10, the insulating seat 12 and the upper mating element 111 are preferably engaged with each other as integral by inject molding, here, the lower portion of the upper mating element 111 downwardly exceeds the insulating seat 12. A top portion of the insulating seat 12 is provided with a mating cavity 121, and an upper end of the upper mating element 111 protrudes into the mating cavity 121, so as to be used to mate with a cable connector (not shown). In the present embodiment, a lower end of the insulating seat 12 is recessed with a limiting groove 122 along a circumferential direction of the insulating seat 12.

Referring to FIG. 8 to FIG. 10, the mating side conductive shell 13 of the present preferred embodiment includes a first metal shell 131 and a second metal shell 132 fixed to a lower end of the first metal shell 131. The mating side conductive shell 13 may be made of a material (such as brass) which is cheaper and has better rigidity and conductivity at the same time, the mating side conductive shell 13 may be preferably fabricated by die casting or CNC (Computerized Numerical Control) processing, the mating side conductive shell 13 fabricated by the above processes does not have a joint seam, so that the mating side conductive shell 13 may have better water-tightness.

The first metal shell 131 sheathes an outer periphery of the insulating seat 12, the first metal shell 131 is substantially equal to the insulating seat 12 in length, so that the insulating seat 12 completely surrounds the insulating seat 12 therein. As shown in FIG. 9, a lower portion of the first metal shell 131 is provided with a plurality of limiting protrusions 1311 which protrudes inwardly, the limiting protrusion 1311 may correspondingly enter into the limiting groove 122 of the insulating seat 12 so as to fix the first metal shell 131 and the insulating seat 12.

As shown in FIG. 10, the second metal shell 132 sheathes a lower end of the first metal shell 131, the second metal shell 132 surrounds the center conductive pin 11 from outside. A receiving cavity 1326 is formed between the second metal shell 132 and the center conductive pin 11, the receiving cavity 1326 is positioned below the insulating seat 12. Preferably, a sealing element 17 is further provided between the second metal shell 132 and the center conductive pin 11, the sealing element 17 attaches to a lower end surface of the insulating seat 12, so that a gap between the corresponding components may be sufficiently sealed to prevent external water from permeating.

The second metal shell 132 has an outer wall 1321, a partitioning wall 1322 which is positioned inside the outer wall 1321, and is spaced apart from the outer wall 1321 and extends downwardly, a top wall 1323 which connects a top portion of the outer wall 1321 and a top portion of the partitioning wall 1322, and an upward extending wall 1324 which extends upwardly from the top wall 1323.

The outer wall 1321 surrounds to form the receiving cavity 1326, preferably a bottom end of the outer wall 1321 is designed with a contract mouth by necking. The partitioning wall 1322 has a length extending downwardly which is less than a length of the outer wall 1321, the partitioning wall 1322 and the top wall 1323, the outer wall 1321 forms a partitioning cavity 1327. The upward extending wall 1324 sheathes an outer periphery of the first metal shell 131, a limiting step is further formed between the upward extending wall 1324 and the top wall 1323, and may limit the first metal shell 131 in position in the up-down direction.

Referring to FIG. 8, the second metal shell 132 further has a limiting flange 1325 which protrudes outwardly from the outer wall 1321 along a circumferential direction of the second metal shell 132. In combination with FIG. 3, the limiting flange 1325 may be used to limit in position together with the mounting shell 400.

The second metal shell 132 and the first metal shell 131 may be fixed by structure cooperative form, for example by interference fit or structure limiting and the like; also may further be fixed by other auxiliary manner, for example by laser welding, adhering and the like.

The present preferred embodiment separates the mating side conductive shell 13 into the first metal shell 131 and the second metal shell 132, so that the mating side conductive shell 13 and the insulating seat 12 may be more conveniently assembled together. But in other some possible embodiments which are not shown in the figures, it also may be considered that the mating side conductive shell 13 is designed as a unitary structure.

Referring to FIG. 8 and FIG. 10, the movable conductive shell 14 substantially is a barrel shape structure, surrounds a lower portion of the center conductive pin 11 from outside. An upper end of the movable conductive shell 14 is received in the receiving cavity 1326 of the second metal shell 132, and can move relative to the second metal shell 132 in the up-down direction. In the present embodiment, the upper end of the movable conductive shell 14 has a larger outer diameter, but a lower end of the movable conductive shell 14 relatively has a smaller outer diameter, so that the upper end of the movable conductive shell 14 forms a boss 141. A gap for movement is presented between the boss 141 and the outer wall 1321 of the second metal shell 132, so as to allow the movable conductive shell 14 and the second metal shell 132 to relatively move, at the same time, the boss 141 is stopped by the contract mouth at the bottom end of the outer wall 1321, so that the boss 141 will not detach from the second metal shell 132, the lower end of the movable conductive shell 14 extends downwardly from the contract mouth of the outer wall 1321 of the floating connector 1.

According to practical requirement, the movable conductive shell 14 may have a relatively larger thickness, thus has a certain strength and facilitates transmission of high current.

Referring to FIG. 8 and FIG. 10, the elastic element 15 may be a spring or similar structure member which may elastically extend. The elastic element 15 is mounted between the mating side conductive shell 13 and the movable conductive shell 14, by the elastic deformation of the elastic element 15, relative move amount between the mating side conductive shell 13 and the movable conductive shell 14 can be absorbed, so as to maintain movable connection, which has elasticity, between the mating side conductive shell 13 and the movable conductive shell 14.

Specifically, in the present embodiment, as shown in FIG. 10, an upper end of the elastic element 15 is receive in the partitioning cavity 1327 defined by the outer wall 1321 and the partitioning wall 1322, a lower end of the elastic element 15 elastically abuts against the upper end of the movable conductive shell 14. The outer wall 1321 and the partitioning wall 1322 may functions to guide the elastic element 15, and promote stability of the elastic element 15.

Referring to FIG. 8 and FIG. 9, the inner conductive shell 16 may use a metal material which has better elasticity (such as nickel copper), may be formed by processes such as bending, stamping and the like, so that the inner conductive shell 16 has better elasticity. The inner conductive shell 16 includes a main body 160 which is a barrel shape structure, the main body 160 is provided with a fixing portion 161 and a movable contacting portion 162 positioned below the fixing portion 161, a protruding edge 163 further bends from a top portion of the main body 160 and protrudes outwardly, the protruding edge 163 is divided into two parts which are spaced apart from each other and respectively extend along an edge of the main body 160.

In the present embodiment, an upper half part of the main body 160 are arranged with a plurality of first openings 1601 along a circumferential direction of the main body 160, a lower half part of the main body 160 is provided with a plurality of second openings 1602 along the circumferential direction of the main body 160.

The fixing portion 161 includes a plurality of fixing tabs 1611, the plurality of fixing tabs 1611 protrude inwardly from upper edges of the plurality of first openings 1601 respectively.

The movable contacting portion 162 includes a plurality of elastic arms 1621, the plurality of elastic arms 1621 protrude outwardly from the plurality of second openings 1602 respectively. A tip of each elastic arm 1621 is a free end, so that each elastic arm 1621 has elasticity relative to the main body 160.

In combination with FIG. 10, the inner conductive shell 16 is mounted in the receiving cavity 1326 of the second metal shell 132, the fixing portion 161 snaps on the second metal shell 132 and the movable contacting portion 162 elastically abuts against the movable conductive shell 14, so to establish an electrical connection path between the mating side conductive shell 13 and the movable conductive shell 14.

Specifically, in the present embodiment, the inner conductive shell 16 is fixed between the partitioning wall 1322 of the second metal shell 132 and the outer wall 1321. The main body 160 substantially attaches with an outer surface of the partitioning wall 1322, the plurality of fixing tabs 1611 snap with the outer surface of the partitioning wall 1322, in some embodiments not shown, the partitioning wall 1322 may be provided with a snapping groove so as more firmly snap with the plurality of fixing tabs 1611. An upper surface of the protruding edge 163 abuts against a lower surface of the top wall 1323, a lower surface of the protruding edge 163 elastically abuts against the upper end of the elastic element 15, therefore, the inner conductive shell 16 may be subjected to elastic pushing of the elastic element 15 so as to avoid the inner conductive shell 16 downwardly detaching from the second metal shell 132, which is beneficial to maintain a position of the inner conductive shell 16. A lower end of the main body 160 downwardly exceeds the partitioning wall 1322, each elastic arm 1621 of the movable contacting portion 162 elastically abuts against an inner wall of the movable conductive shell 14.

The inner conductive shell 16 acts as an intermediate medium between the mating side conductive shell 13 and the movable conductive shell 14, when the floating connector 1 is in a vibration circumstance so that the mating side conductive shell 13 and the movable conductive shell 14 relatively move, the fixing portion 161 of the inner conductive shell 16 is used to maintain connection with the mating side conductive shell 13 and the movable contacting portion 162 can always elastically abut against the movable conductive shell 14, therefore, by the inner conductive shell 16, the electrical connection path between the mating side conductive shell 13 and the movable conductive shell 14 can be maintained.

In some other embodiments not shown in the figure, it also may be that, the fixing portion 161 snaps on the movable conductive shell 14, but the movable contacting portion 162 elastically abuts against the mating side conductive shell 13. Similarly, by elastic deformation of the inner conductive shell 16, the electrical connection between the mating side conductive shell 13 and the movable conductive shell 14 can be maintained.

Preferably, the inner conductive shell 16 is configured to more easily elastically deform in comparison with the mating side conductive shell 13 and the movable conductive shell 14, so that by means of elastic deformation of the movable contacting portion 162, stability of the electrical connection between the mating side conductive shell 13 and the movable conductive shell 14 is further promoted. Specifically, the inner conductive shell 16 may be fabricated by a metal sheet which is thinner and has elasticity so as to facilitate generation of elastic deformation; or, at least the movable contacting portion 162 is made to have a thinner thickness, or by a structure design such as bending, providing an opening and the like, the movable contacting portion 162 is made to easily elastically deform.

On another hand, the inner conductive shell 16 is interposed between the elastic element 15 and the center conductive pin 11, the inner conductive shell 16 which uses the metal material may functions as shielding, which may prevent electromagnetic radiation emitted by a high speed electrical signal of the center conductive pin 11 from acting on the elastic element 15 to generate an improper reflected noise, so that transmission quality of the electrical signal is promoted.

An assembling sequence of the floating connector 1 substantially is: forming the insulating seat 12 on the center conductive pin 11 by inject molding, making the first metal shell 131 sheathe the outer periphery of the insulating seat 12, providing the sealing element 17 to below the insulating seat 12; sequentially mount the inner conductive shell 16, the elastic element 15 and the movable conductive shell 14 into the receiving cavity 1326 of the second metal shell 132, the bottom end of the second metal shell 132 is performed by necking; finally fixing the second metal shell 132 to the lower end of the first metal shell 131.

Again in combination with FIG. 3 and FIG. 7, when the floating connector 1 is in use, the floating connector 1 and the connector base 2 mounted to the circuit board 3 are connected together to constitute the floating connector assembly 100. Here, the lower end of the movable conductive shell 14 of the floating connector 1 and an upper end of the outer metal shell 23 of the connector base 2 form an electrical connection; the lower end of the center conductive pin 11 of the floating connector 1 and the upper end of the metal post 21 of the connector base 2 elastically abut against each other and form an electrical connection. Finally, the floating connector assembly 100 is mounted into the mounting shell 400, and the mounting shell 400 together with the floating connector assembly 100 is mounted onto a product as desired.

FIG. 11 to FIG. 14 schematically illustrate a structure of a floating connector assembly 600 of a second embodiment of the present disclosure.

Similarly, the floating connector assembly 600 includes a circuit board 3, a connector base 2 mounted on the circuit board 3 and a floating connector 6 mounted on the connector base 2.

Figure 12:
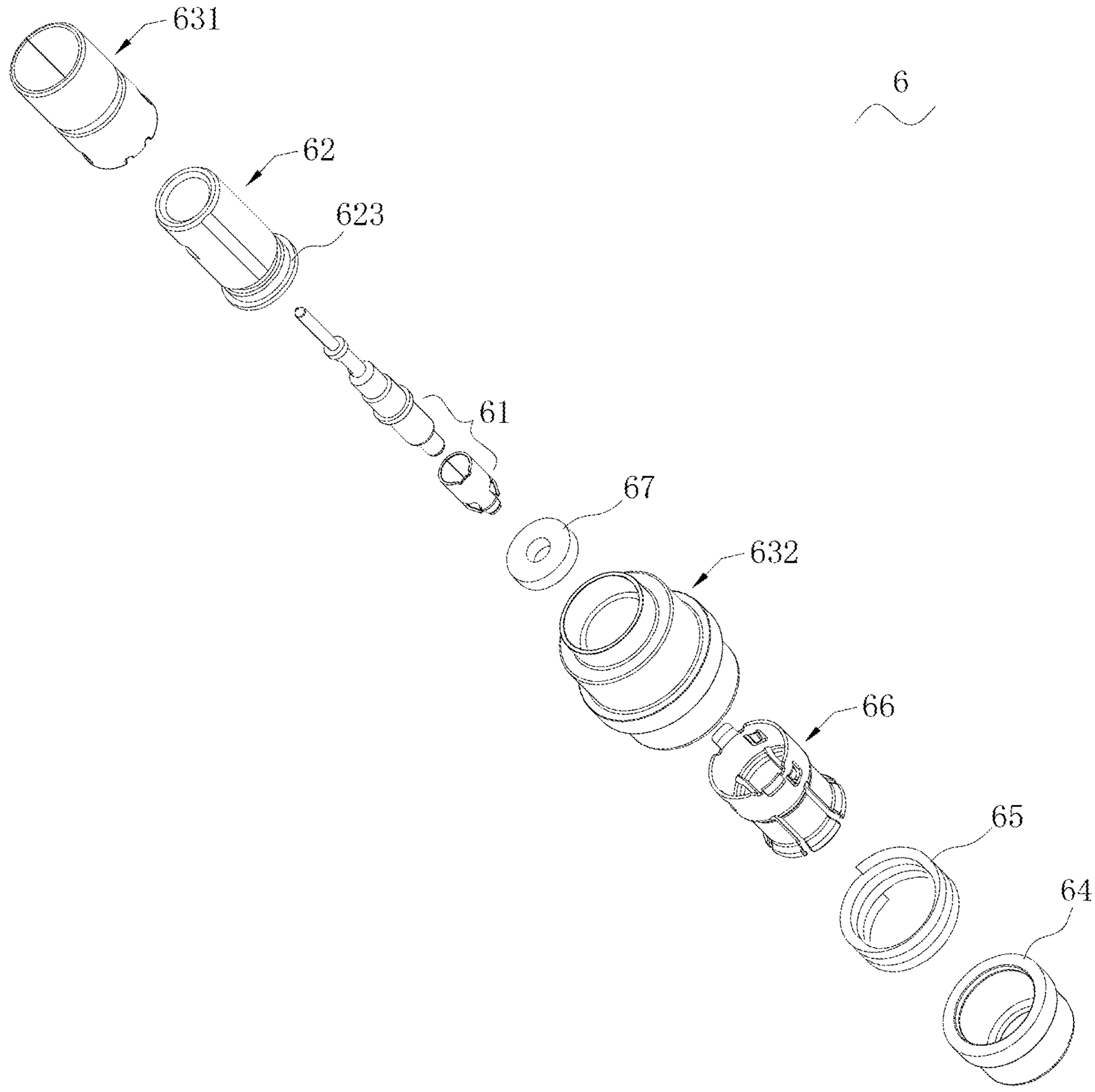
FIG. 12 and FIG. 13 are perspective exploded views of the floating connector of FIG. 11 from two different angles in which main difference from the first embodiment lies in an inner conductive shell.
Figure 13:
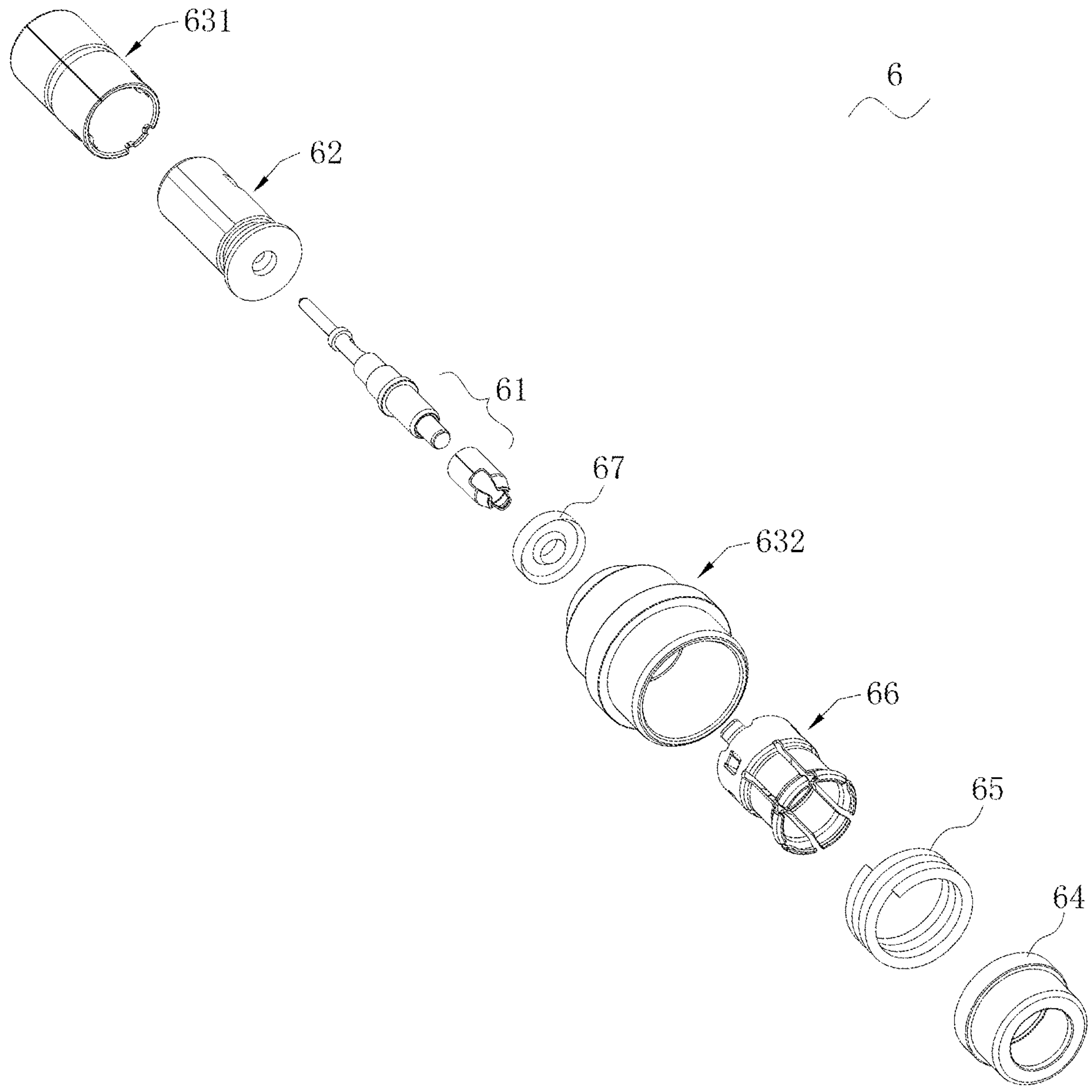

Referring to FIG. 12 and FIG. 13, a structure of the floating connector 6 of the second embodiment is substantially the same as the structure of the floating connector 1 of the first embodiment, similarly, the floating connector 6 includes a center conductive pin 61, an insulating seat 62, a mating side conductive shell 63, a movable conductive shell 64, an elastic element 65, an inner conductive shell 66 and a sealing element 67. Mainly difference lies in that a specific structure of the inner conductive shell 66 of the second embodiment is different.

Figure 14:
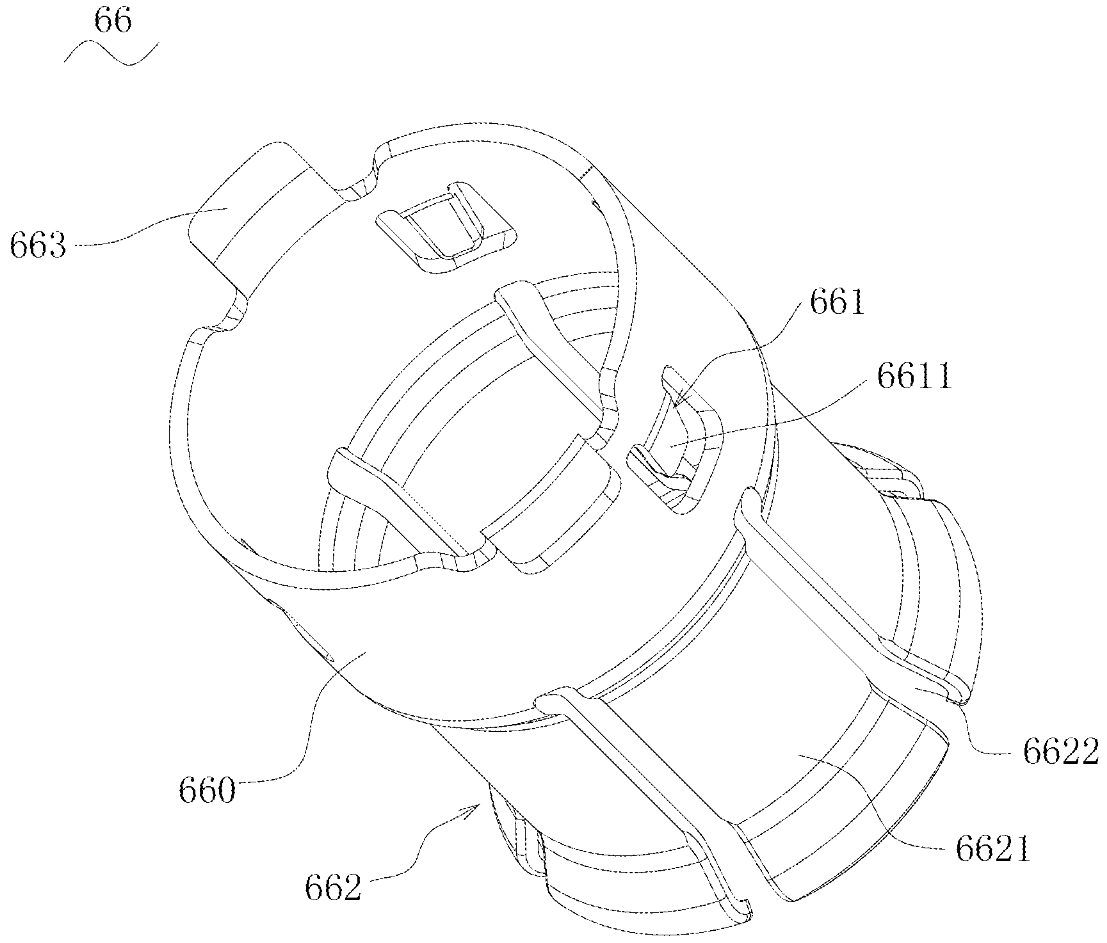
FIG. 14 is an enlarged view of the inner conductive shell of FIG. 12.

Referring to FIG. 14, in the second embodiment, the inner conductive shell 66 includes a main body 660 which substantially is a barrel shape, a fixing portion 661 which is provided on the main body 660 and a movable contacting portion 662 which extends downwardly from a lower end of the main body 660. Two protruding edge 663 bend outwardly from and protrude from a top end of the main body 660. The fixing portion 661 includes a plurality of fixing tabs 6611 which protrude inwardly from a middle part of the main body 660.

The movable contacting portion 662 includes a plurality of elastic arms 6621 which are arranged along a circumferential direction of the movable contacting portion 662, each elastic arm 6621 extends downwardly from a lower end edge of the main body 660 and bends outwardly, an elongated notch 6622 is formed between two adjacent elastic arms 6621 and the lower end edge of the main body 660, a tip of each elastic arm 6621 is an elastic free end which is arc in shape.

Figure 11:
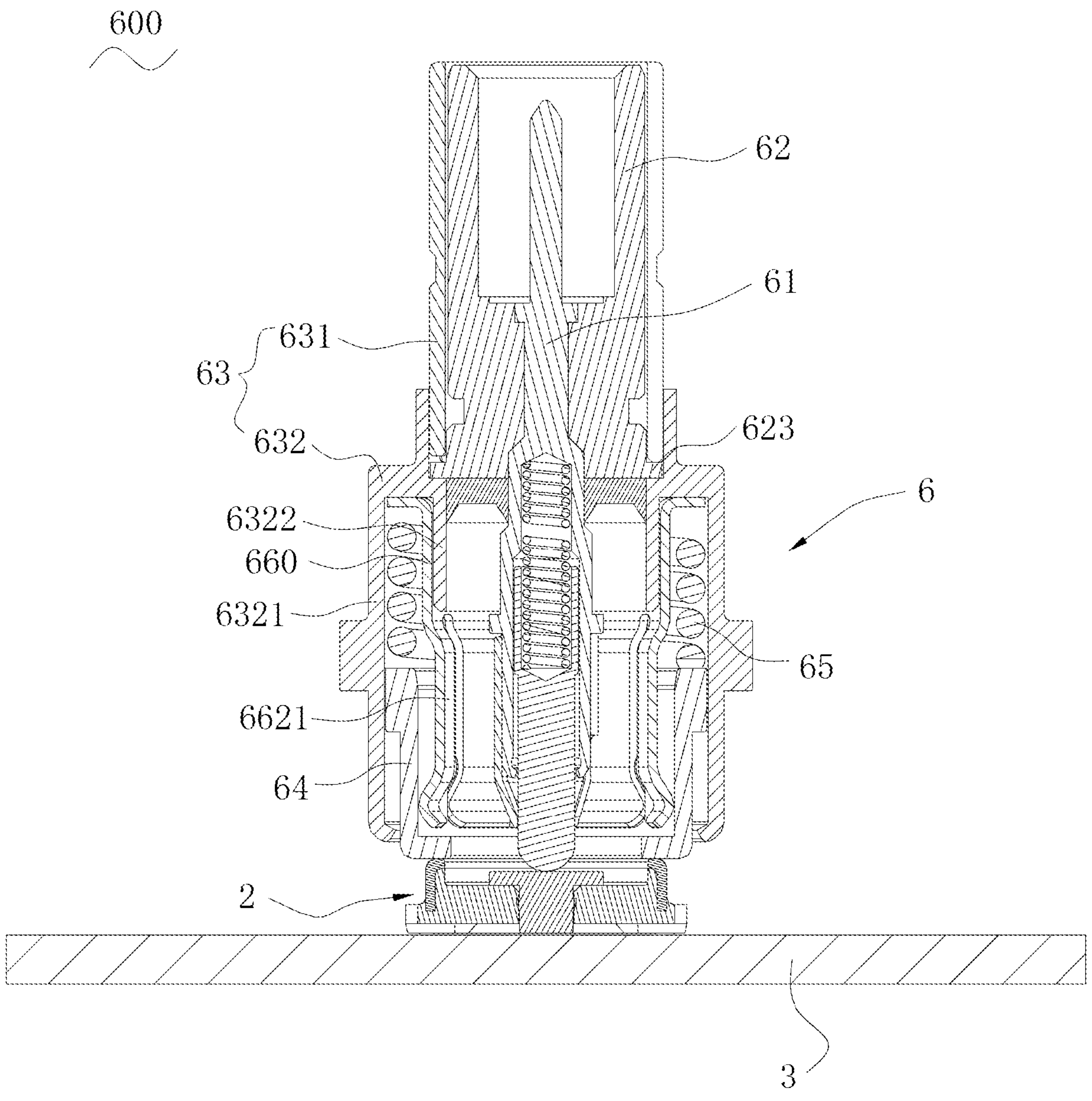
FIG. 11 is a cross sectional view of a floating connector assembly of a second embodiment of the present disclosure with a floating connector in a compressed state.

As shown in FIG. 11, the main body 660 of the inner conductive shell 66 is mounted between the outer wall 6321 of the second metal shell 632 of the mating side conductive shell 63 and the partitioning wall 6322, and preferably attaches with the outer surface of the partitioning wall 6322, the plurality of elastic arms 6621 downwardly exceed the partitioning wall 6322, the tip of the elastic arm 6621 elastically abuts against the inner wall of the movable conductive shell 64.

It is noted that, the elastic element 65 of FIG. 11 is in a compressed state, a most part structure of the movable conductive shell 64 contracts and upwardly enters into the second metal shell 632, the movable conductive shell 64 is substantially positioned in an upper limit position thereof, the elastic arm 6621 abuts against a location of the inner wall of the movable conductive shell 64 close to the lower end of the inner wall of the movable conductive shell 64. In comparison with referring to the elastic element 15 in a non-compressed state as shown in schematic view of FIG. 10, in the state as shown in FIG. 10 the movable conductive shell 14 is substantially positioned in a lower limit position thereof, the elastic arm 1621 of the inner conductive shell 16 abuts against a location of the inner wall of the movable conductive shell 14 close to the upper end of the inner wall of the movable conductive shell 14.

Although the inner conductive shell 16 as shown in FIG. 10 and the inner conductive shell 66 as shown in FIG. 11 are different, in comparison with the states in the two figures, it can be seen that, when the movable conductive shell 14/64 moves relative to the mating side conductive shell 13/63 in the up-down direction, the movable contacting portion 162/662 of the inner conductive shell 16/66 can always maintain to elastically slide over and abut against the movable conductive shell 14/64.

Referring to FIG. 11 and FIG. 12, another difference of the floating connector 6 of the second embodiment from the first embodiment lies in that, a lower end of the insulating seat 62 is provided with a positioning flange 623 which protrudes along a circumferential direction of the insulating seat 62, an upper surface of the positioning flange 623 and the first metal shell 631 of the mating side conductive shell 63 to abut against each other for limiting in position, a lower surface of the positioning flange 623 and the second metal shell 632 abut against each other for limiting in position.

Other configuration of the floating connector assembly 600 of the second embodiment may refer to the first embodiment, specific description thereof is not repeated herein.

FIG. 15 to FIG. 18 schematically illustrate a structure of a floating connector assembly 700 of a third embodiment of the present disclosure.

Main difference between the third embodiment and the first embodiment lies in that, in the floating connector 7, the inner conductive shell 76 is fixed to an inner surface of the partitioning wall 7322 of the second metal shell 732 of the mating side conductive shell 73.

Figure 18:
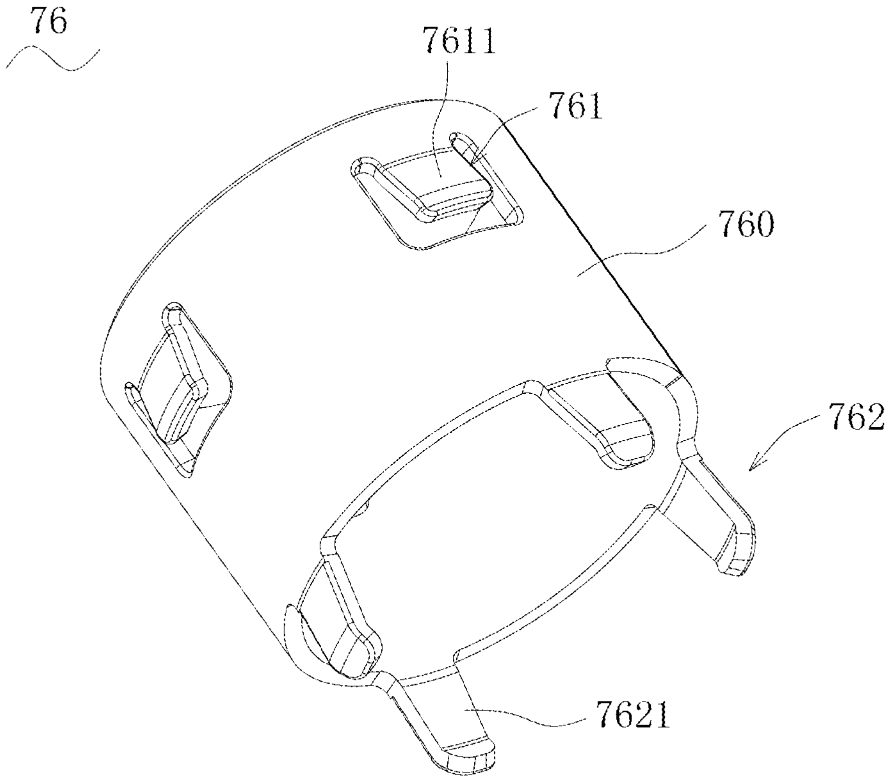
FIG. 18 is an enlarged view of an inner conductive shell of FIG. 16.

Mainly referring to FIG. 18, the fixing portion 761 of the inner conductive shell 76 includes a plurality of fixing tabs 7611 which protrude outwardly from a middle part of the main body 760, the movable contacting portion 762 includes a plurality of elastic arms 7621 which bend downwardly and outwardly from a lower end of the main body 760 and extend, the plurality of elastic arms 7621 are spaced apart from each other along a circumferential direction of the main body 760.

Figure 15:
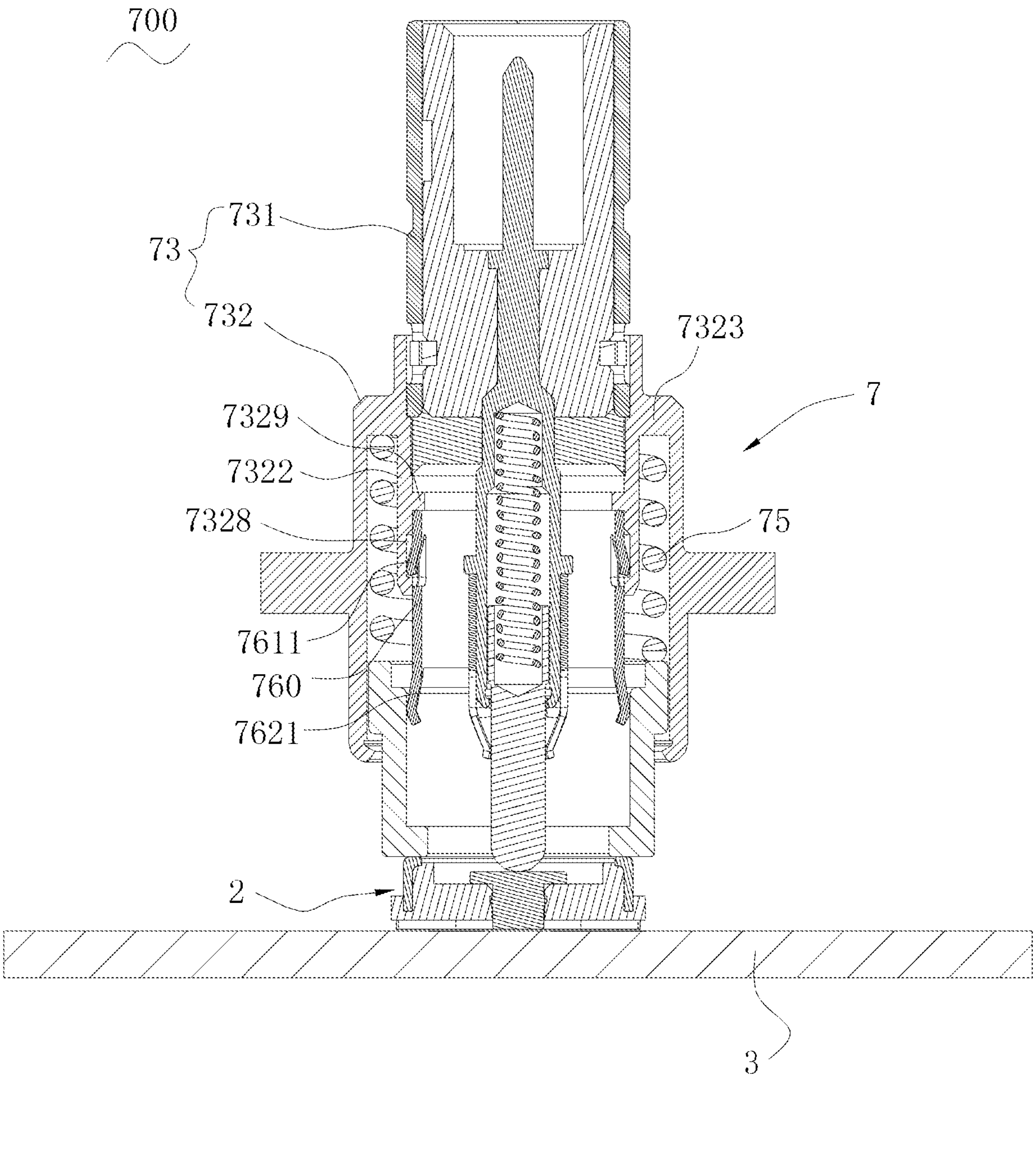
FIG. 15 is a cross sectional view of a floating connector assembly of a third embodiment of the present disclosure.
Figure 16:
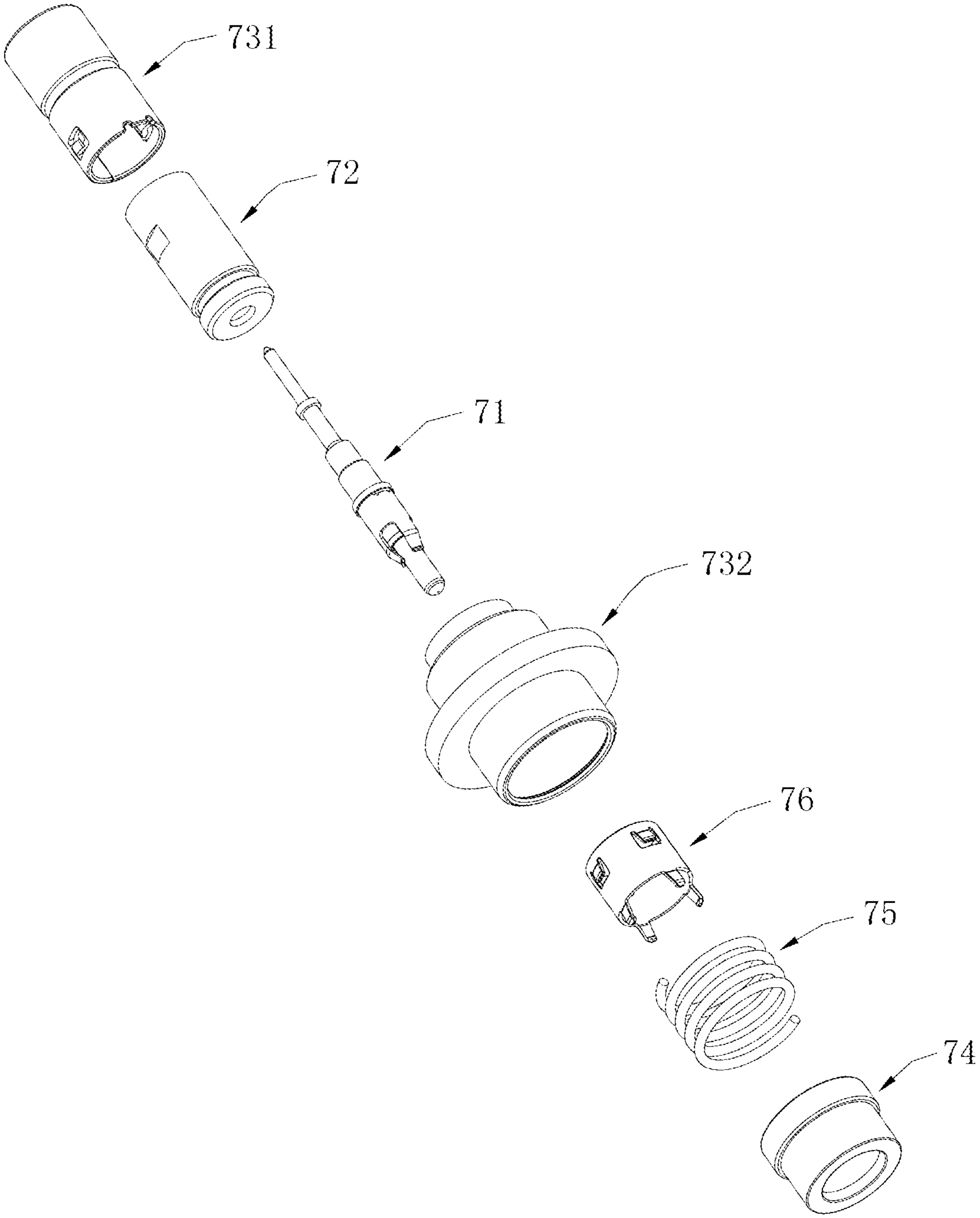
FIG. 16 and FIG. 17 are perspective exploded views of a floating connector of FIG. 15 from two different angles.
Figure 17:
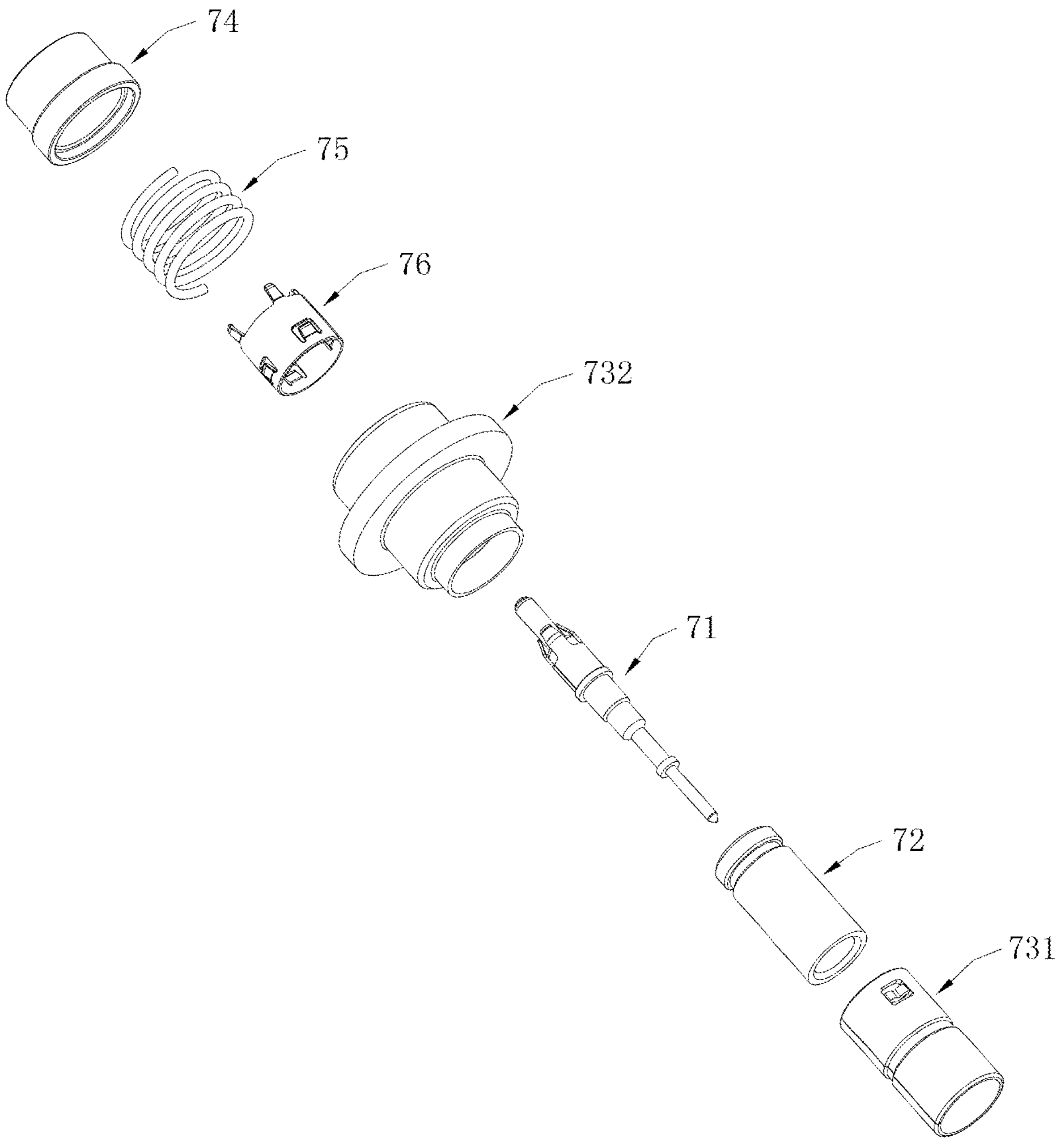

In combination with FIG. 15, in the third embodiment, the main body 760 of the inner conductive shell 76 is surrounded by the partitioning wall 7322, the fixing tabs 7611 is snapped in a snapping groove 7328 provided on an inner surface of the partitioning wall 7322. Preferably, a stopping protrusion 7329 further protrudes from the inner surface of the partitioning wall 7322, the stopping protrusion 7329 stops above the main body 760. The elastic arm 7621 of the inner conductive shell 76 elastically abuts against the inner wall of the movable conductive shell 74. An upper end of the elastic element 75 is against on the second metal shell 732 from below, specifically, the elastic element 75 directly abuts against a lower surface of the top wall 7323 of the second metal shell 732.

Other configuration of the floating connector 7 of the third embodiment may refer to the first embodiment, specific description thereof is not repeated herein.

Figure 19:
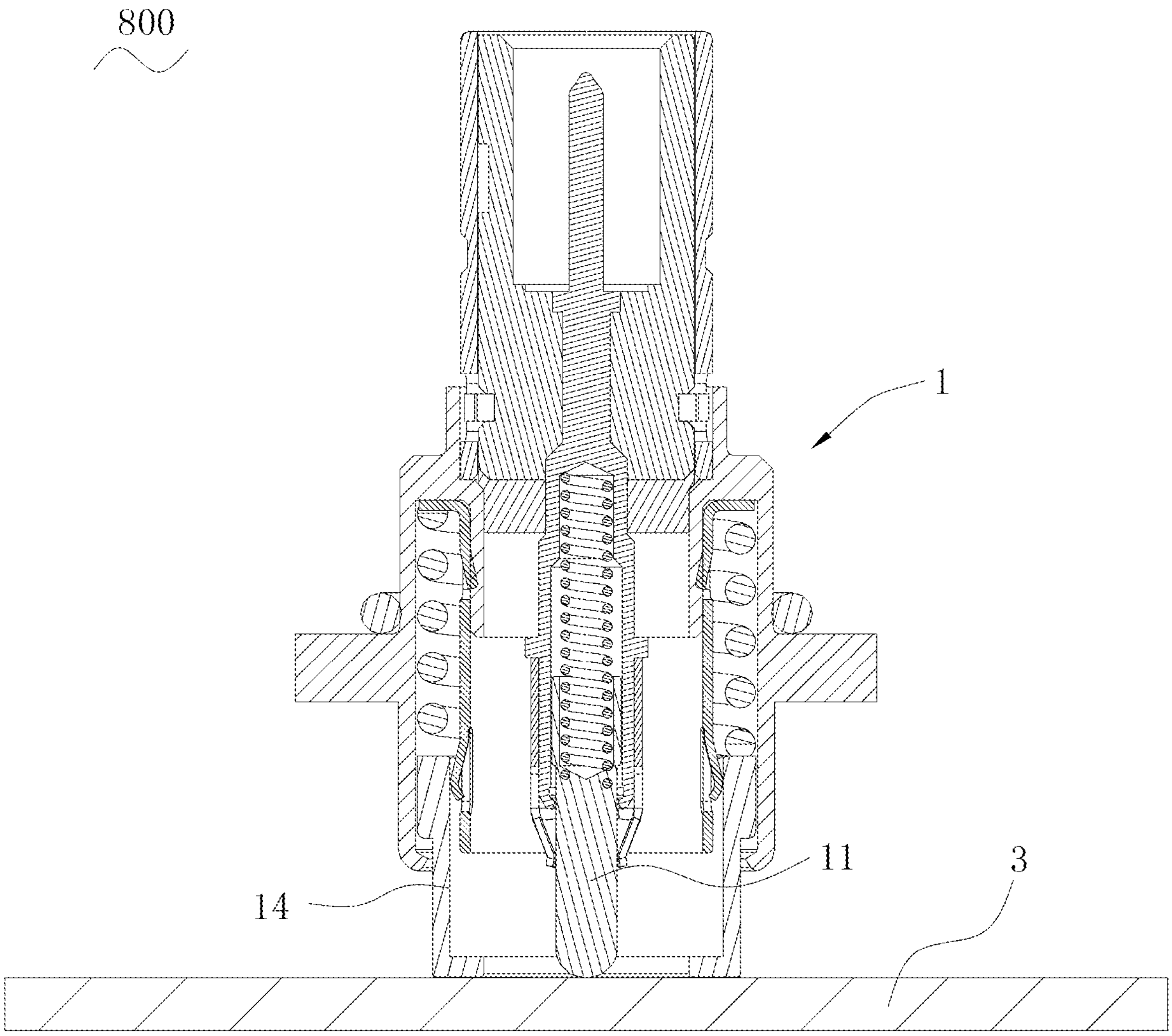
FIG. 19 is a cross sectional view of the floating connector of the first embodiment of the present disclosure directly mounted on a circuit board.
Figure 20:
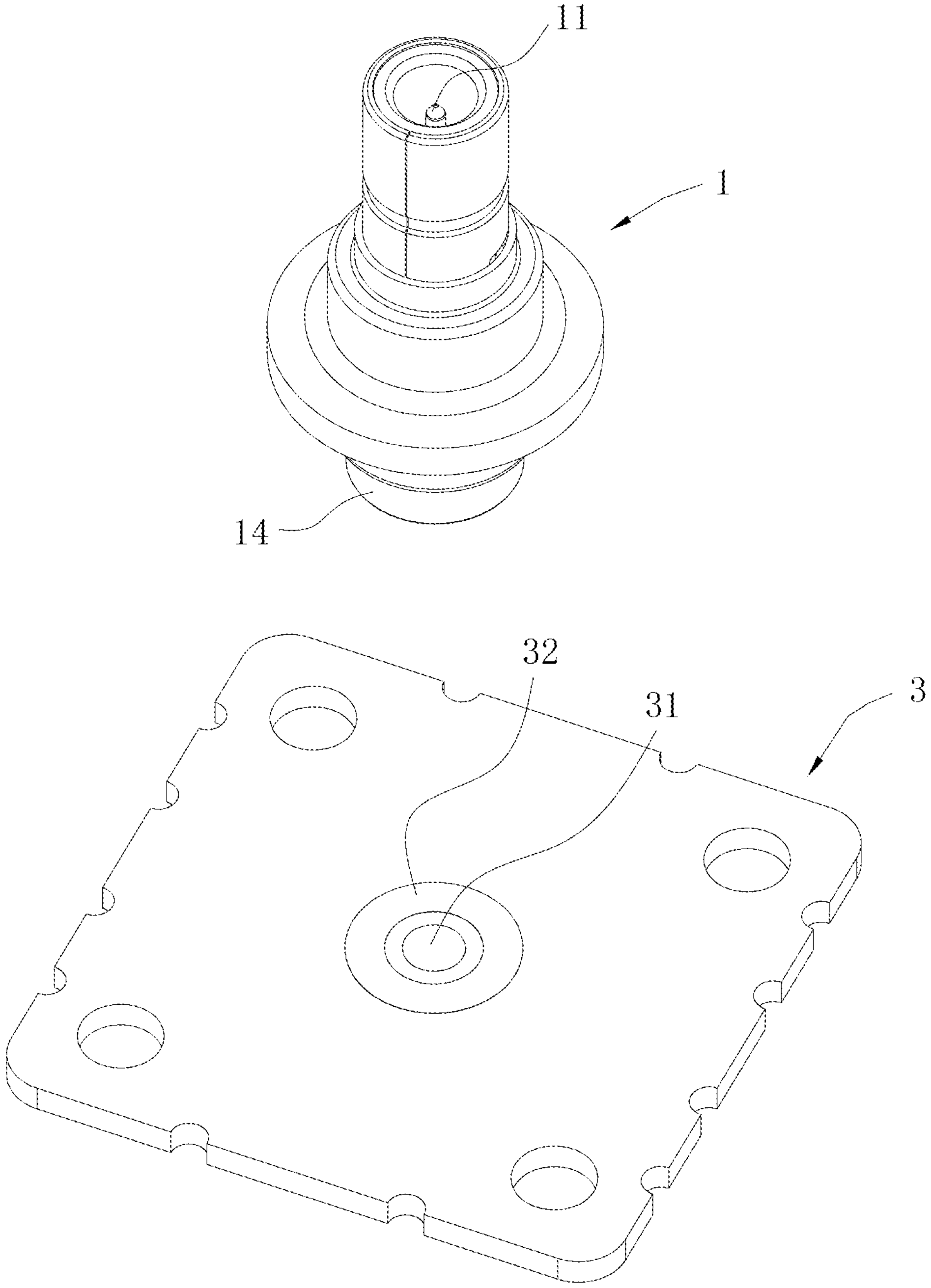
FIG. 20 is a perspective exploded view of FIG. 19.

FIG. 19 and FIG. 20 schematically illustrate a floating connector assembly 800 constituted by that the floating connector 1 of the first embodiment of the present disclosure is directly mounted on the circuit board 3. In comparison with the first embodiment, the floating connector assembly 800 omits the connector base 2.

The circuit board 3 is provided with a center contacting point 31 and an outer side contacting point 32 which is spaced apart from the center contacting point 31 and surrounds the center contacting point 31 from outside. Here, the center contacting point 31 and the outer side contacting point 32 may be soldering pads, conductive patterns or metal members soldered on the circuit board and the like. The lower end of the movable conductive shell 14 of the floating connector 1 and the outer side contacting point 32 are electrically connected, the lower end of the center conductive pin 11 of the floating connector 1 and the center contacting point 31 abut against each other.

It is noted that, with respect to the floating connector assembly 600/700 of the second embodiment and the third embodiment, the connector base 2 also may be omitted, so that the floating connector 6/7 is directly mounted on the circuit board 3.

According to the above embodiments, in the floating connector 1/6/7 of the present disclosure, the interior electrical connection path is established by the center conductive pin 11/61/71, the exterior electrical connection path is established by cooperation of the mating side conductive shell 13/63/73, the movable conductive shell 14/64/74 and the inner conductive shell 16/66/76. Here, the elastic element 15/65/75 may absorb relative displacement amount between the mating side conductive shell 13/63/73 and the movable conductive shell 14/64/74, so that when the mating side conductive shell 13/63/73 and the movable conductive shell 14/64/74 generate relative movement, the inner conductive shell 16/66/76 always maintains connection with the mating side conductive shell 13/63/73 and the movable conductive shell 14/64/74 via the fixing portion 161/661/761 and the movable contacting portion 162/662/762, so that stability of the exterior electrical connection path is maintained. Because the inner conductive shell 16/66/76 is an independent component which is independent from the mating side conductive shell 13/63/73 and the movable conductive shell 14/64/74, it is more flexible for the inner conductive shell 16/66/76 to select material and fabricating process, the inner conductive shell 16/66/76 may have better elasticity and does not easily generate a problem of immediate rupture. Based on provision of the inner conductive shell 16/66/76, the mating side conductive shell 13/63/73 and the movable conductive shell 14/64/74 may use a clearance fit design, so that the mating side conductive shell 13/63/73 and the movable conductive shell 14/64/74 not only can relatively slide in the up-down direction, but also can generate relative floating in the horizontal direction, which can be applicable to a field where vibration level is higher.

At the same time, the inner conductive shell 16/66/76 is interposed between the elastic element 15/65/75 and the center conductive pin 11/61/71, the inner conductive shell 16/66/76 may function as shielding, so that electromagnetic radiation emitted by a high speed electrical signal of the center conductive pin 11/61/71 can be prevented from acting on the elastic element 15/65/75 to generate an improper reflected noise, which is particularly applicable to a situation of high frequency signal transmission.

The above described contents are only the preferred embodiments of the present disclosure, which cannot limit the implementing solutions of the present disclosure, those skilled in the art may conveniently make corresponding variation or modification based on the main concept and spirit of the present disclosure, therefore the extent of protection of the present disclosure shall be determined by terms of the Claims.

What is claimed is:

1. A floating connector comprising:

a center conductive pin which comprises an upper mating element and a lower mating element;

an insulating seat which surrounds the center conductive pin therein;

a mating side conductive shell which surrounds an outer periphery of the insulating seat and forms a receiving cavity positioned below the insulating seat;

a movable conductive shell, an upper end of which is movably received in the receiving cavity and extends downwardly from the receiving cavity;

an elastic element which elastically abuts against the upper end of the movable conductive shell; and an inner conductive shell which is mounted in the receiving cavity and is used to electrically connect the mating side conductive shell and the movable conductive shell, the inner conductive shell being interposed between the elastic element and the center conductive pin;

the inner conductive shell having:

a fixing portion which snaps on one of the mating side conductive shell and the movable conductive shell; and a movable contacting portion which slideably elastically abuts against the other of the mating side conductive shell and the movable conductive shell.

2. The floating connector according to claim 1, wherein the mating side conductive shell comprises an outer wall and a partitioning wall which is positioned inside the outer wall, the partitioning wall is spaced apart from the outer wall and extends downwardly; and an upper end of the elastic element is received between the outer wall and the partitioning wall.

3. The floating connector according to claim 2, wherein the fixing portion comprises a plurality of fixing tabs which are arranged along a circumferential direction of the inner conductive shell, the fixing tabs snap on the partitioning wall of the mating side conductive shell; and the movable contacting portion comprises a plurality of elastic arms which are arranged along the circumferential direction of the inner conductive shell, each elastic arm slideably elastically abuts against the movable conductive shell.

4. The floating connector according to claim 3, wherein the inner conductive shell is fixed to an inner surface of the partitioning wall, the fixing tabs protrudes outwardly and snaps on the partitioning wall; and the upper end of the elastic element is against on the mating side conductive shell from below.

5. The floating connector according to claim 3, wherein the inner conductive shell is fixed between the partitioning wall and the outer wall, the fixing tabs protrudes inwardly and snaps on an outer surface of the partitioning wall.

6. The floating connector according to claim 5, wherein a protruding edge protrudes outwardly from a top portion of the inner conductive shell; and the upper end of the elastic element is against on the protruding edge from below.

7. The floating connector according to claim 1, wherein the mating side conductive shell comprises a first metal shell which sheathes an outer periphery of the insulating seat and a second metal shell which is fixed to a lower end of the first metal shell, the receiving cavity is formed between the second metal shell and the center conductive pin.

8. The floating connector according to claim 1, wherein the center conductive pin further comprises a spring and a conductive sheathe member;

two ends of the spring are respectively elastically against on the upper mating element and the lower mating element, the lower mating element can elastic move relative to the upper mating element in an up-down direction; and the conductive sheathe member comprises a sheathing portion and an elastic contacting portion, the sheathing portion is fixed to an outer surface of the upper mating element, the elastic contacting portion slideably elastically abuts against an outer surface of the lower mating element.

9. A floating connector assembly comprising a circuit board, a connector base fixed on the circuit board and the floating connector of claim 1 mounted on the connector base; and the connector base comprising a metal post, an insulator which surrounds the metal post and an outer metal shell which is fixed to an outer surface of the insulator; and the metal post mating with the lower mating element of the center conductive pin, the outer metal shell mating with a lower end of the movable conductive shell.

10. A floating connector assembly comprising a circuit board and the floating connector of claim 1 mounted on the circuit board;

the circuit board being provided with a center contacting point and an outer side contacting point which is spaced apart from and surrounds the center contacting point from outside;

the lower mating element of the center conductive pin electrically connecting with the center contacting point; and a lower end of the movable conductive shell electrically connecting with the outer side contacting point.

* * * * *